(12) United States Patent
Adams et al.

(10) Patent No.: US 8,561,158 B2
(45) Date of Patent: *Oct. 15, 2013

(54) PROVIDING CERTIFICATE MATCHING IN A SYSTEM AND METHOD FOR SEARCHING AND RETRIEVING CERTIFICATES

(75) Inventors: Neil Patrick Adams, Waterloo (CA); Michael Stephen Brown, Kitchener (CA); Herbert Anthony Little, Waterloo (CA)

(73) Assignee: Blackberry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,098

(22) Filed: Sep. 13, 2012

(65) Prior Publication Data
US 2013/0007447 A1    Jan. 3, 2013

Related U.S. Application Data

(60) Continuation of application No. 12/405,551, filed on Mar. 17, 2009, now Pat. No. 8,296,829, which is a division of application No. 10/931,109, filed on Sep. 1, 2004, now Pat. No. 7,549,043.

(51) Int. Cl.
*H04L 9/32* (2006.01)
*G06F 15/82* (2006.01)
*H04L 9/08* (2006.01)
*G06F 7/04* (2006.01)

(52) U.S. Cl.
USPC ............... 726/6; 713/156; 713/175; 713/176; 709/206

(58) Field of Classification Search
USPC ................ 726/6; 713/156, 175, 176; 709/206
See application file for complete search history.

(56) References Cited

U.S. PATENT DOCUMENTS

| | | | |
|---|---|---|---|
| 4,028,500 | A | 6/1977 | McClure et al. |
| 5,410,602 | A | 4/1995 | Finkelstein et al. |
| 5,457,748 | A | 10/1995 | Bergum et al. |
| 5,623,546 | A | 4/1997 | Hardy et al. |
| 5,634,051 | A | 5/1997 | Thomson |

(Continued)

FOREIGN PATENT DOCUMENTS

| | | |
|---|---|---|
| AU | 2005204221 | 3/2004 |
| AU | 2005204223 B2 | 3/2006 |

(Continued)

OTHER PUBLICATIONS

European Search Report. Application No. 04104195.5. Dated: Dec. 14, 2006.

(Continued)

*Primary Examiner* — Michael Simitoski
(74) *Attorney, Agent, or Firm* — Bereskin & Parr LLP/S.E.N.C.R.L., s.r.l.

(57) ABSTRACT

A system and method for searching and retrieving certificates, which may be used in the processing of encoded messages. In one broad aspect, certificate identification data that uniquely identifies a certificate associated with a message is generated. The certificate identification data can then be used to determine whether the certificate is stored on a computing device. Only the certificate identification data is needed to facilitate the determination alleviating the need for a user to download the entire message to the computing device in order to make the determination.

22 Claims, 8 Drawing Sheets

(56) References Cited

U.S. PATENT DOCUMENTS

| | | |
|---|---|---|
| 5,666,530 A | 9/1997 | Clark et al. |
| 5,710,922 A | 1/1998 | Alley et al. |
| 5,727,202 A | 3/1998 | Kucala |
| 5,778,068 A | 7/1998 | Johnson et al. |
| 5,778,346 A | 7/1998 | Frid-Nielsen et al. |
| 5,812,671 A | 9/1998 | Ross, Jr. |
| 5,870,030 A | 2/1999 | DeLuca et al. |
| 5,956,707 A | 9/1999 | Chu |
| 5,991,399 A | 11/1999 | Graunke et al. |
| 6,000,000 A | 12/1999 | Hawkins et al. |
| 6,061,448 A | 5/2000 | Smith et al. |
| 6,073,237 A | 6/2000 | Ellison |
| 6,081,601 A | 6/2000 | Raivisto |
| 6,084,969 A | 7/2000 | Wright et al. |
| 6,085,323 A | 7/2000 | Shimizu et al. |
| 6,119,228 A | 9/2000 | Angelo et al. |
| 6,125,369 A | 9/2000 | Wu et al. |
| 6,209,098 B1 | 3/2001 | Davis |
| 6,219,694 B1 | 4/2001 | Lazaridis et al. |
| 6,229,894 B1 | 5/2001 | Van Oorschot et al. |
| 6,230,186 B1 | 5/2001 | Yaker |
| 6,233,572 B1 | 5/2001 | Crawford, Jr. et al. |
| 6,266,420 B1 | 7/2001 | Langford et al. |
| 6,266,775 B1 | 7/2001 | Kamba |
| 6,289,105 B1 | 9/2001 | Murota |
| 6,301,658 B1 | 10/2001 | Koehler |
| 6,313,732 B1 | 11/2001 | DeLuca et al. |
| 6,348,972 B1 | 2/2002 | Taniguchi et al. |
| 6,377,946 B1 | 4/2002 | Okamoto et al. |
| 6,389,455 B1 | 5/2002 | Fuisz |
| 6,421,707 B1* | 7/2002 | Miller et al. .................. 709/206 |
| 6,531,985 B1 | 3/2003 | Jones et al. |
| 6,564,320 B1 | 5/2003 | de Silva et al. |
| 6,567,914 B1 | 5/2003 | Just et al. |
| 6,633,873 B1 | 10/2003 | Nakamura |
| 6,661,927 B1 | 12/2003 | Suarez et al. |
| 6,697,942 B1 | 2/2004 | L'Heureux et al. |
| 6,725,262 B1 | 4/2004 | Choquier et al. |
| 6,732,144 B1 | 5/2004 | Muranaga et al. |
| 6,732,273 B1* | 5/2004 | Byers ........................... 713/193 |
| 6,745,024 B1 | 6/2004 | DeJaco et al. |
| 6,779,115 B1 | 8/2004 | Naim |
| 6,819,766 B1 | 11/2004 | Weidong |
| 6,829,357 B1 | 12/2004 | Alrabady et al. |
| 6,904,521 B1 | 6/2005 | Jivsov |
| 6,918,038 B1 | 7/2005 | Smith et al. |
| 6,925,568 B1 | 8/2005 | Heinonen |
| 6,931,532 B1 | 8/2005 | Davis et al. |
| 6,983,367 B2 | 1/2006 | Go et al. |
| 6,993,137 B2 | 1/2006 | Fransdonk |
| 6,996,720 B1 | 2/2006 | DeMello et al. |
| 7,003,667 B1 | 2/2006 | Slick et al. |
| 7,020,708 B2 | 3/2006 | Nelson et al. |
| 7,028,186 B1 | 4/2006 | Stenman et al. |
| 7,032,030 B1* | 4/2006 | Codignotto .................... 709/246 |
| 7,032,240 B1 | 4/2006 | Cronce et al. |
| 7,113,927 B1 | 9/2006 | Tanaka et al. |
| 7,127,604 B2 | 10/2006 | Lide et al. |
| 7,136,897 B1* | 11/2006 | Raghunandan ............... 709/206 |
| 7,171,552 B1 | 1/2007 | Bell |
| 7,213,047 B2 | 5/2007 | Yeager et |
| 7,228,418 B1 | 6/2007 | Girault |
| 7,254,608 B2 | 8/2007 | Yeager et al. |
| 7,254,712 B2 | 8/2007 | Godfrey et al. |
| 7,299,502 B2 | 11/2007 | Schmeling et al. |
| 7,373,512 B1 | 5/2008 | Just |
| 7,430,663 B2 | 9/2008 | Brown et al. |
| 7,529,374 B2 | 5/2009 | Huttunen |
| 7,546,453 B2 | 6/2009 | Little et al. |
| 7,549,043 B2 | 6/2009 | Adams et al. |
| 7,627,896 B2 | 12/2009 | Herrmann |
| 7,640,428 B2 | 12/2009 | Adams et al. |
| 7,653,698 B2 | 1/2010 | Wieneke et al. |
| 7,664,947 B2 | 2/2010 | Fang |
| 7,814,161 B2 | 10/2010 | Brown et al. |
| 8,209,530 B2 | 6/2012 | Adams et al. |
| 8,296,829 B2 | 10/2012 | Adams et al. |
| 8,301,878 B2 | 10/2012 | Brown et al. |
| 8,312,165 B2 | 11/2012 | Brown et al. |
| 2001/0011308 A1 | 8/2001 | Clark et al. |
| 2001/0046307 A1 | 11/2001 | Wong |
| 2001/0050990 A1 | 12/2001 | Sudia |
| 2002/0007453 A1 | 1/2002 | Nemovicher |
| 2002/0032861 A1 | 3/2002 | Azuma |
| 2002/0035685 A1 | 3/2002 | Ono et al. |
| 2002/0035687 A1 | 3/2002 | Skantze |
| 2002/0051544 A1 | 5/2002 | Kikuchi et al. |
| 2002/0053023 A1 | 5/2002 | Patterson et al. |
| 2002/0059375 A1 | 5/2002 | Pivowar et al. |
| 2002/0059383 A1 | 5/2002 | Katsuda |
| 2002/0080752 A1 | 6/2002 | Johansson et al. |
| 2002/0099766 A1 | 7/2002 | Tuli |
| 2002/0147905 A1 | 10/2002 | Perlman |
| 2002/0165967 A1 | 11/2002 | Morgan |
| 2002/0169954 A1 | 11/2002 | Bandini et al. |
| 2002/0173295 A1 | 11/2002 | Nykanen et al. |
| 2002/0176067 A1 | 11/2002 | Charbon |
| 2003/0002671 A1 | 1/2003 | Inchalik et al. |
| 2003/0028647 A1 | 2/2003 | Grosu |
| 2003/0074555 A1 | 4/2003 | Fahn et al. |
| 2003/0126085 A1 | 7/2003 | Srinivasan |
| 2003/0163567 A1 | 8/2003 | McMorris et al. |
| 2003/0172122 A1 | 9/2003 | Little et al. |
| 2003/0196084 A1 | 10/2003 | Okereke et al. |
| 2003/0198350 A1 | 10/2003 | Foster et al. |
| 2003/0212888 A1 | 11/2003 | Wildish et al. |
| 2004/0024826 A1* | 2/2004 | Halahmi et al. ............... 709/206 |
| 2004/0030681 A1 | 2/2004 | Shannon et al. |
| 2004/0052356 A1 | 3/2004 | McKinzie et al. |
| 2004/0083364 A1 | 4/2004 | Andreaux et al. |
| 2004/0090457 A1* | 5/2004 | Serdy et al. .................... 345/752 |
| 2004/0093493 A1 | 5/2004 | Bisbee et al. |
| 2004/0096055 A1* | 5/2004 | Williams et al. ................. 380/1 |
| 2004/0133520 A1 | 7/2004 | Callas et al. |
| 2004/0133775 A1 | 7/2004 | Callas et al. |
| 2004/0171369 A1 | 9/2004 | Little et al. |
| 2004/0172453 A1* | 9/2004 | De Mendonca et al. ....... 709/206 |
| 2004/0177248 A1 | 9/2004 | Yoshida |
| 2004/0196978 A1 | 10/2004 | Godfrey et al. |
| 2004/0202327 A1 | 10/2004 | Little et al. |
| 2004/0205248 A1 | 10/2004 | Little et al. |
| 2005/0005097 A1 | 1/2005 | Murakawa |
| 2005/0039100 A1 | 2/2005 | Bade et al. |
| 2005/0055372 A1 | 3/2005 | Springer, Jr. et al. |
| 2005/0071508 A1* | 3/2005 | Brown et al. .................. 709/246 |
| 2005/0080642 A1 | 4/2005 | Daniell |
| 2005/0114671 A1 | 5/2005 | Little et al. |
| 2005/0148323 A1 | 7/2005 | Little et al. |
| 2005/0149442 A1 | 7/2005 | Adams et al. |
| 2005/0160292 A1 | 7/2005 | Batthish et al. |
| 2005/0163320 A1 | 7/2005 | Brown et al. |
| 2005/0188219 A1 | 8/2005 | Annic et al. |
| 2005/0203855 A1 | 9/2005 | Malcolm |
| 2005/0210289 A1 | 9/2005 | Brown et al. |
| 2005/0222991 A1 | 10/2005 | Ikenoya |
| 2005/0246763 A1 | 11/2005 | Corcoran et al. |
| 2006/0015722 A1 | 1/2006 | Rowan et al. |
| 2006/0031300 A1* | 2/2006 | Kock et al. ..................... 709/206 |
| 2006/0036848 A1 | 2/2006 | Brown et al. |
| 2006/0036849 A1 | 2/2006 | Brown et al. |
| 2006/0036865 A1 | 2/2006 | Brown et al. |
| 2006/0059332 A1 | 3/2006 | Adams et al. |
| 2006/0143700 A1 | 6/2006 | Herrmann |
| 2007/0050624 A1 | 3/2007 | Lord et al. |
| 2007/0083749 A1 | 4/2007 | Fang |
| 2007/0118874 A1 | 5/2007 | Adams et al. |
| 2007/0123307 A1 | 5/2007 | Adams et al. |
| 2007/0165844 A1 | 7/2007 | Little |
| 2007/0299921 A1 | 12/2007 | Brown et al. |
| 2008/0016359 A1 | 1/2008 | Godfrey et al. |
| 2008/0306922 A1 | 12/2008 | Brown et al. |
| 2009/0199007 A1 | 8/2009 | Adams et al. |
| 2010/0100730 A1 | 4/2010 | Adams et al. |
| 2011/0029627 A1 | 2/2011 | Brown et al. |

(56) References Cited

U.S. PATENT DOCUMENTS

| | | | |
|---|---|---|---|
| 2012/0239927 A1 | 9/2012 | Adams et al. | |
| 2013/0007447 A1 | 1/2013 | Adams et al. | |
| 2013/0013917 A1 | 1/2013 | Brown et al. | |
| 2013/0067009 A1 | 3/2013 | Brown et al. | |

FOREIGN PATENT DOCUMENTS

| | | | |
|---|---|---|---|
| CA | 2476914 | | 2/2006 |
| CA | 2517209 | C | 3/2006 |
| CA | 2517211 | C | 3/2006 |
| CN | 100531029 | C | 8/2009 |
| CN | 100566236 | | 12/2009 |
| EP | 0500222 | A1 | 8/1992 |
| EP | 0500245 | A2 | 8/1992 |
| EP | 0841770 | A2 | 5/1998 |
| EP | 0942568 | A2 | 9/1999 |
| EP | 1096725 | A2 | 5/2001 |
| EP | 1096727 | A2 | 5/2001 |
| EP | 1580953 | A1 | 9/2005 |
| EP | 1806683 | A1 | 7/2007 |
| EP | 1871060 | | 12/2007 |
| EP | 1633101 | B1 | 4/2008 |
| EP | 1633100 | | 7/2008 |
| EP | 1936920 | | 3/2009 |
| GB | 2328125 | A | 2/1999 |
| JP | 06276221 | | 9/1994 |
| JP | 07-162407 | | 6/1995 |
| JP | 7-509333 | | 10/1995 |
| JP | 08-251221 | | 9/1996 |
| JP | 09-046330 | | 2/1997 |
| JP | 10-022992 | | 1/1998 |
| JP | 10-107832 | | 4/1998 |
| JP | 11-272581 | | 10/1999 |
| JP | 11-272582 | | 10/1999 |
| JP | 2000-104774 | | 4/2000 |
| JP | 2001-103571 | | 4/2001 |
| JP | 2001-197055 | | 7/2001 |
| JP | 2001-265216 | | 9/2001 |
| JP | 2002-163395 | | 6/2002 |
| JP | 2002-535884 | | 10/2002 |
| JP | 2003-046499 | | 2/2003 |
| JP | 2003-348078 | | 12/2003 |
| JP | 2004-048139 | | 2/2004 |
| JP | 2004-179724 | | 6/2004 |
| JP | 4530953 | B2 | 8/2010 |
| JP | 4555195 | B2 | 9/2010 |
| KR | 1020030059303 | A | 7/2003 |
| KR | 10-2006-0050904 | | 5/2006 |
| KR | 10-0650432 | B1 | 11/2006 |
| KR | 10-1072942 | | 10/2011 |
| TW | 200629858 | | 8/2006 |
| TW | I282231 | | 6/2007 |
| WO | 9412938 | | 6/1994 |
| WO | 9636934 | | 11/1996 |
| WO | 9741661 | | 11/1997 |
| WO | 9834374 | | 8/1998 |
| WO | 9905814 | | 2/1999 |
| WO | 9906900 | | 2/1999 |
| WO | 9917564 | | 4/1999 |
| WO | 9927678 | | 6/1999 |
| WO | 9963709 | | 12/1999 |
| WO | 0031931 | | 6/2000 |
| WO | 0069114 | | 11/2000 |
| WO | 0072506 | | 11/2000 |
| WO | 01/01644 | | 1/2001 |
| WO | 0116933 | A1 | 3/2001 |
| WO | 0124434 | | 4/2001 |
| WO | 01/41353 | | 6/2001 |
| WO | 0163386 | | 8/2001 |
| WO | 0171608 | | 9/2001 |
| WO | 0178491 | | 10/2001 |
| WO | 02/101580 | | 12/2002 |
| WO | 02101605 | | 12/2002 |
| WO | 03005636 | | 1/2003 |
| WO | 03009561 | | 1/2003 |
| WO | 03/079627 | | 9/2003 |
| WO | 03/079628 | | 9/2003 |

OTHER PUBLICATIONS

Korean Search Report. Application No. 10-2005-0081103. Dated: Sep. 27, 2006.

Australian Search Report. Application No. 2005204221. Dated: Nov. 6, 2006.

Research in Motion Limited, "Blackberry Security with S/MIME support Package version 1.5", Dec. 17, 2003.

Singapore Written Opinion. Application No. 200505340-0. Dated: Jan. 25, 2005.

Myers, M. et al., X.509 Internet Public Key Infrastructure Online Certificate Status Protocol—OCSP, RFC2560 (Jun. 1999).

Chinese First Office Action (English translation). Application No. 200510095984.7. Dated: Nov. 21, 2008.

European Communication under Rule 71(3) EPC. Application No. 08154580.8. Dated: Oct. 23, 2008.

Australian Notice of Acceptance. Application No. 2005204221. Dated: Jan. 15, 2008.

Indian Examination Letter. Application No. 2290/DEL/2005. Dated: Apr. 13, 2007.

Korean Decision for Final Rejection (English translation). Application No. 10-2005-0081103. Dated: Apr. 12, 2007.

Singapore Examination Report. Application No. 200505340-0. Dated: Sep. 19, 2006.

Chadwick et al., "Modifying LDAP to Support X.509-based PKIs", In Seventeenth annual IFIP WG 11.3 Working Conference on Database and Applications Security, Colorado, Aug. 2003, pp. 1-9.

Japanese First Office Action (English Translation). Application No. 2005-250982. Dated: Jan. 14, 2009.

Miyagawa, "Internet security course starting from zero" second period, ASCII network PRO, vol. 5, No. 6, Japan ASCII Corporation, Jun. 2000, vol. 5, pp. 96-99.

Shikii, C++ Builder component programming [26], DDJ vol. 8, No. 3, Japan, Shoei Corporation, Mar. 1999, vol. 8, pp. 137-142.

Harris, "Content Privacy and Content Security Working Together," Internet Article, Content Technologies White Paper, pp. 1-10 (Sep. 1999).

Mambo, "Proxy Signatures: Delegation of the Power to Sign Messages," IEICE Transactions on Fundamentals of Electronics, Communications and Computer Sciences, IEICE Tokyo, Japan, vol. E79-A, No. 9, pp. 1338-1353 (Sep. 1, 1996).

Subramanyam, "Security in Mobile Systems," Reliable Distributed Systems, 1998 Proceedings, 17th IEEE Symposium on W. Lafayette, IN, USA, Oct. 20-23, 1998, Los Alamitos, CA, USA, IEEE Comput. Soc., USA, pp. 407-412 (Oct. 20, 1998).

Syverson, "Limitations on Design Principles for Public Key Protocols," Security and Privacy, 1996, Proceedings, 1996 IEEE Symposium on Oakland, CA, USA, May 6-8, 1996, Los Alamitos, CA, USA, IEEE Comput. Soc., USA, pp. 62-72 (May 6, 1996).

Torvinen, "Wireless PKI: Fundamentals," Internet Article, Radicchio White Paper, pp. 1-15 (2000).

Hoffman: "Enhanced Security Services for S/MIME", Database IETF RFC Online IEFT; RFC 2634, Jun. 1999, pp. 1-58 (Chapter 3, pp. 24-32), XP002220386.

U.S. Office Action Response, U.S. Appl. No. 10/931,983, dated Mar. 11, 2009.

Applicant summary of interview with Examiner, U.S. Appl. No. 10/931,983, dated Jul. 2, 2009.

Notice of Allowance, U.S. Appl. No. 10/931,983, dated Jul. 9, 2009.

Notice of Allowance, U.S. Appl. No. 10/931,983, dated Aug. 20, 2009.

U.S. Office Action, U.S. Appl. No. 12/645,003, dated Sep. 30, 2011.

U.S. Office Action Response, U.S. Appl. No. 12/645,003, dated Dec. 30, 2011.

Applicant summary of interview with Examiner, U.S. Appl. No. 12/645,003, dated Mar. 8, 2012.

Notice of Allowance and Examiner initiated interview summary, U.S. Appl. No. 12/645,003, dated Mar. 14, 2012.

(56) References Cited

OTHER PUBLICATIONS

Co-pending U.S. Appl. No. 13/483,216, "System and Method for Searching and Retrieving Certificates", filed May 30, 2012.
Ramsdell, B. "Secure/Multipurpose Internet Mail Extensions (S/MIME) Version 3.1 Message Specification" (RFC 3851), Jul. 2004.
Housley, R. "Cryptographic Message Syntax (CMS)" (RFC 3852), Jul. 2004.
Certificate of Grant. Hong Kong Patent Application No. 06108963.0. Dated: Aug. 29, 2008.
Notice of Allowance. Canadian Patent Application No. 2,517,209. Dated: Feb. 16, 2011.
Notice of Grant. Indian Patent Application No. 2290/DEL/2005. Dated: Feb. 11, 2009.
Office Action. Canadian Patent Application No. 2,517,209. Dated: Jul. 15, 2010.
Final Office Action. Korean Patent Application No. 10-2007-0081319. Dated: Dec. 27, 2010.
Hametvaara, Vesa, "Certificate Management in Mobile Devices", May 2002.
Housley, R. et al., "Internet X509 Public Key Infrastructure Certificate and CRL Profile (RFC 2459)", Jan. 1999.
ITU-T, "Information Technology—Open Systems Interconnection—The Directory: Public-key and Attribute Certificate Frameworks", Mar. 2000.
Myers, M. et al., "Certificate Management Messages over CMS (RFC 2797)", Apr. 2000.
Taiwanese First Office Action (English Translation). Application No. 094129967. Dated: Mar. 10, 2009.
Taiwanese Office Action (English Translation). Application No. 094129967. Dated: Mar. 19, 2010.
Japanese Office Action (English Translation). Application No. 2005-250982. Mailing Date: Mar. 19, 2010.
Chinese Notification of Completion of Formalities and Notification of Grant (English Translation). Application No. 200510095984.7. Dated: Jul. 24, 2009.
Indian Examination Report. Application No. 2290/DEL/2005. Dated: Jan. 2, 2009.
Singapore Notification of Grant. Application No. 200505340-0. Dated: Dec. 31, 2008.
Korean First Office Action (English Translation). Application No. 10-2007-0081319. Dated: Jun. 21, 2010.
Co-pending U.S. Appl. No. 12/645,003, "System and Method for Searching and Retrieving Certificates", filed Dec. 22, 2009.
Japanese Notice of Allowance. Application No. 2005-250982. Dated: Jul. 6, 2010.
Gutmann, Peter. "A Reliable, Scalable General-purpose Certificate Store", ACSAC 2000.
Ramsdell, B. "S/MIME Version 3 Certificate Handling" (RFC2632), Jun. 1999.
Ramsdell, B. "Secure/Multipurpose Internet Mail Extensions (S/MIME) Version 3.1 Certificate Handling" (RFC3850), Jun. 2004.
Canadian First Office Action. Application No. 2,517,209. Dated: Jul. 14, 2008.
European Search and Examination Report. Application No. 08154580.8. Dated: May 27, 2008.
European Communication under Rule 51(4) EPC. Application No. 04104195.5. Dated: Oct. 31, 2007.
Co-pending U.S. Appl. No. 10/931,983, "System and Method for Searching and Retrieving Certificates", filed Sep. 2, 2004.
United States Office Action. U.S. Appl. No. 10/931,983. Dated: Nov. 13, 2007.
Amendment. U.S. Appl. No. 10/931,983. Dated: Mar. 12, 2008.
United States Office Action. U.S. Appl. No. 10/931,983. Dated: Jul. 15, 2008.
Response after Final. U.S. Appl. No. 10/931,983. Dated: Sep. 15, 2008.
United States Advisory Action. U.S. Appl. No. 10/931,983. Dated: Sep. 23, 2008.

Request for Continued Examination. U.S. Appl. No. 10/931,983. Dated: Oct. 14, 2008.
United States Office Action. U.S. Appl. No. 10/931,983. Dated: Dec. 16, 2008.
European Search and Examination Report. Application No. 04104195.5. Dated: Feb. 10, 2005.
Prosecution documents for U.S. Appl. No. 10/931,109.
Prosecution documents for U.S. Appl. No. 12/645,003.
Prosecution documents for U.S. Appl. No. 12/405,551.
United States Notice of Allowance for U.S. Appl. No. 13/483,216, dated May 30, 2013.
United States Office Action Response for U.S. Appl. No. 13/483,216, dated May 16, 2013.
United States Non-Final Office Action for U.S. Appl. No. 13/483,216, dated Feb. 25, 2013.
Previously co-pending U.S. Appl. No. 10/931,109, "Providing Certificate Matching in a System and Method for Searching and Retrieving Certificates", filed Sep. 1, 2004.
Australian Patent Office Examination Report dated of mailing Sep. 1, 2006 SG 200505340-0.
Chinese Certificate of Inventive Patent, Chinese Patent No. ZL200510095984.7, Dec. 2, 2009.
The Republic of China (Taiwan) Patent Certificate Invention Patent No. I329445, Aug. 21, 2010.
Korean Notice of Decision for Patent, Korean Patent Application No. 10-2007-0081319, deliver date Aug. 24, 2011.
Korean Certificate of Patent, Patent No. 10-1072942, registration date Oct. 6, 2011.
Japanese Certificate of Patent, Patent No. 4555195, dated Jul. 23, 2010.
Australian Deed of Letters Patent, Australian Patent Application No. 2005204221, dated May 8, 2008.
Singapore Certificate of Grant, SG Application No. 200505340-0, dated Dec. 31, 2008.
Response, EP application No. 04104195.5, dated Apr. 4, 2005.
Response, EP application No. 04104195.5, dated Mar. 29, 2007.
Notice of Allowance, U.S. Appl. No. 12/645,003, dated May 22, 2012.
Reply to communication under 51(4), EP application No. 04104195. 5, dated Mar. 7, 2008.
Decision to grant a European patent, EP application No. 04104195.5, dated Jun. 5, 2008.
Certificate of Grant EP application No. 04104195.5, Patent No. 1,633,100, published on Jul. 2, 2008.
Reply to exam report, EP application No. 08154580.8, dated Jul. 18, 2008.
Reply to exam report, EP application No. 08154580.8, dated Sep. 12, 2008.
Reply to communication under 71(3), EP application No. 08154580. 8, dated Jan. 14, 2009.
Decision to grant a European patent, EP application No. 08154580.8, dated Feb. 26, 2009.
Certificate of Grant EP application No. 08154580.8, dated Mar. 25, 2009.
"BlackBerry with the S/MIME Support Package Version 4.0 User Guide Supplement", URL:http://www.blackberry.com/knowlesdgecenterpublic/livelink.exe/fetch/2- 000/8067/645045/8533/348781/1181993/SMIME.sub.-Support.sub.-Package.sub.---version.sub.--4.0.sub.--User.sub.--Guide.sub.--Supplement?nodeid=1181919- &vernum=0>, Dec. 4, 2006, paragraphs 0001-0005, XP002410691.
Berson T. et al.: "Cryptography as a network service" 8th Annual Symposium on Network and Distributed System Security. (NDSS'01) Internet SOC Reston, VA, USA, Feb. 7-9, 2001, pp. 1-12, XP002551706 "The whole document".
Dusse et al.: "S/MIME Version 2 Certificate Handling", Database IETF RFC Online IETF: RFC 2312, Mar. 1998, pp. 1-20 (Chapter 2.1, Chapter 4.1), XP0022220385.
Zollner J: "Gateway to Overcome Incompatibilities of Security Mechanisms" Reliable Distributed Systems, 1999. Proceedings of the 19th IEEE Symposium on Lausanne, Switzerland Oct. 19-22,

(56) References Cited

OTHER PUBLICATIONS

1999, Los Alamitos, Cal, USA, IEEE Compu. Soc, US Oct. 19, 1999, pp. 372-377, XP 010357040 ISBN: 978-0-7695-0290-8 "the whole document".
Stallings, W.: "S/MIME: E-Mail Gets Secure", Byte, McGraw-Hill Inc., St. Peterborough, US vol. 23, No. 7, Jul. 1998, pp. 41-42, XP000774260.
Crocker, S. et al.: "MIME Object Security Services; rfc1848.text", IETF Standard, Internet Engineering Task Force, IETF, CH, Oct. 1995, XP015007633.
Katsuro Inaya et al., Imakoso tsukau Windows CE (time to use Windows CE), Monthly ASCII, Oct. 1, 1999, vol. 23, No. 10, pp. 266-285.
Sawano, Hiroyuki, Create a Secure Electronic Mail Environment with S/MIME!, @IT Security & Trust, May 30, 2001, URL: http://www.atmarkit.co.jp/fsecurity/special/04smime/smime01.html.
Blom et al. "Conversational IP Multimedia Security", 4th International Workshop on Mobile and Wireless Communications Network, Sep. 9-11, 2002, pp. 147-151.
Fumy et al. Principles of Key Management, IEEE Journal on Selected Areas in Communications, VDI, 11, No. 5, Jun. 1993, pp. 785-793.
Eskicioglu et al. "A Key Transport Protocol Based on Secret Sharing Applications to Information Security", IEEE Transactions on Consumer Electronics, vol. 48, No. 4, Nov. 2002, pp. 816-824.
Kotzanikolaou et al., "Hybrid Key Establishment for Multiphase Self-Organized Sensor Networks", 6th IEEE International Symposium on a World of Wireless Mobile and Multimedia Networks, Jun. 13-16, 2005, pp. 581-587.
Research in Motion Limited, Blackberry Security White Paper Release 4.0 2005 Internet Address: http://blackberry.comlknowledgecenterpubliclivelink.exe?func=II&objId=S2- S044&objAction=browse&sort=name.
Policht, Marcin, SQL Server 2005 Security—Part 3 Encryption, Database Journal Internet Address: http://www.databasejournal.com/features/mssql/article.php/3483931.
Encrypt Pre-shared Keys in Cisco IOS Router Configuration Example, Document 1D 46420 CISCO Systems, Internet Address: http://www.cisco.com/en/US/tech/tk583/tk372/technologies.sub.--configurat-ion.sub.--example09186a00801f2336.shtml.
Kiely, Don, SQL Server 2005 Secures Your Data Like Never Before, Sep. 29, 2005. Internet Address: http://www.devx.com/codemag/Article/29351?trk=DXRSS.sub.--DB.
Lai, "A mobile subscriber proxy preserving writer-to-reader message security," Military Communications Conference, Milcom '96, Conference Proceedings, IEEE McLean, VA, USA Oct. 21-24, 1996, New York, NY, USA, IEEE, pp. 461-467 (Oct. 21, 1996).
Schumacher: "AutoPGP FAQ, Version 1", Internet Newsgroup, 'Online! (Apr. 19, 1994), XP002230742.
Levien, R.: "Protecting Internet E-Mail From Prying Eyes", Data Communications, McGraw Hill. New York, US, vol. 25, No. 6 (May 1, 1996), pp. 117-118, 120, 122, XP000587586.
Butrico, M., et al.: "Enterprise Data Access from Mobile Computers: An End-to-end Story", Research Issues in Data Engineering, Feb. 28, 2000, pp. 9-16, XP010377083—8 pgs.
Deroest, J.: "Ubiquitous Mobile Computing"; Sunexpert Magazine: Jul. 1998, pp. 54-56, XP002213003—3 pgs.
Jing, Jin et al.: "Client-server Computing in Mobile Environments"; ACM Computing Surveys; Jun. 1999, vol. 31, No. 2, pp. 117-157, XP002212945—41 pgs.
Nakajima, Tatsuo et al.: "Adaptive Continuous Media Applications in Mobile Computing Environments"; Multimedia Computing and Systems '97 Proceedings, IEEE International Conference on Ottawa, Ont., Canada, Jun. 3, 1997, pp. 152-160, XP010239184—9 pgs.
Russell, S.: "Fast Checking of Individual Certificate Revocation on Small Systems"; Computer Security Applications Conference, Phoenix, AZ, Dec. 6, 1999, pp. 249-255, XP010368617—7pgs.
Wasley, D.L.: "Improving Digital Credential Management in Browsers"; Internet article, Jul. 21, 2000, pp. 1-8, XP002213004—9 pgs.
Brown, Ian. et al., "A Proxy Approach to E-mail Security," Software Practice & Experience, John Wiley & Sons Ltd., Chichester, GB, vol. 29, No. 12, pp. 1049-1060 (Oct. 1999).
Brown et al., "PGP in Constrained Wireless Devices," Proceedings of the 9th Usenix Security Symposium, Denver, CO, USA, pp. 247-261 (Aug. 14-17, 2000).
Cole, "An Architecture for a Mobile OSI Mail Access System," IEEE Journal on Selected Areas in Communications, IEEE Inc., New York, USA, vol. 7, No. 2, pp. 249-256 (Feb. 1989).
Dusse, "S/MIME Version 2 Message Specification," The Internet Society, pp. 1-37 (Mar. 1998).
Gong, "Multicast Security and its Extension to a Mobile Environment," Wireless Networks 1, J.C. Baltzer AG, Science Publishers, pp. 281-295 (1995).

* cited by examiner

PROVIDING CERTIFICATE MATCHING IN A SYSTEM AND METHOD FOR SEARCHING AND RETRIEVING CERTIFICATES

CROSS-REFERENCE TO RELATED APPLICATIONS

This application is a continuation of U.S. patent application Ser. No. 12/405,551, filed on Mar. 17, 2009, which is a divisional of U.S. patent application Ser. No. 10/931,109, filed on Sep. 1, 2004, which issued to patent as U.S. Pat. No. 7,549,043. The entire contents of U.S. application Ser. No. 10/931,109 and U.S. patent application Ser. No. 12/405,551 are hereby incorporated by reference.

FIELD OF THE INVENTION

The invention relates generally to the processing of messages, such as e-mail messages, and more specifically to a system and method for searching and retrieving certificates used in the processing of encoded messages.

BACKGROUND OF THE INVENTION

Electronic mail ("e-mail") messages may be encoded using one of a number of known protocols. Some of these protocols, such as Secure Multiple Internet Mail Extensions ("S/MIME") for example, rely on public and private encryption keys to provide confidentiality and integrity, and on a Public Key Infrastructure (PKI) to communicate information that provides authentication and authorization. Data encrypted using a private key of a private key/public key pair can only be decrypted using the corresponding public key of the pair, and vice-versa. The authenticity of public keys used in the encoding of messages is validated using certificates. In particular, if a user of a computing device wishes to encrypt a message before the message is sent to a particular individual, the user will require a certificate for that individual. That certificate will typically comprise the public key of the individual, as well as other identification-related information. Similarly, if a user of a computing device wishes to authenticate the sender of a signed message, the user will require a certificate for that sender.

If the requisite certificate is not already stored on the user's computing device, the certificate must first be retrieved. Searching for and retrieving a specific certificate is a process that generally involves querying a certificate server by having the user manually enter the name and/or e-mail address of the individual for which a certificate is requested in a search form displayed on the computing device. Generally, certificates located in the search are then temporarily downloaded to the computing device for consideration, and a list of located certificates may then be displayed to the user. Selected certificates in the list may then be manually identified by a user for storage in a non-volatile store of the computing device, for potential future use.

Consider an implementation where the user's computing device is a mobile device. When a message is received at a message server and is made available for downloading to the mobile device, the message is typically only transmitted to the mobile device in successive data blocks of a pre-defined size, in order to conserve bandwidth. More specifically, a first block of the message (e.g. 2 KB of data) is downloaded to the mobile device, and if the user wishes to receive more of the message, the user can request that further blocks be downloaded to the mobile device, until the entire message has been downloaded to the mobile device or until some pre-defined limit on the message download is reached.

If the received message is a signed S/MIME message, for example, in order to verify the integrity of the message and authenticate the identity of the sender, the certificate of the sender is required. In some cases, the requisite certificate may accompany the message, with the certificate typically being attached to the end of the message. Alternatively, the requisite certificate may not accompany the message, but one or more certificate identifiers that identify the certificate used in the signing is provided, also typically at the end of the message. The identified certificate can then be retrieved from either a certificate store on the mobile device if the certificate is already stored therein, or a certificate server from which the certificate can be downloaded as noted above.

In order to obtain the certificate or the certificate identifiers for a message, the entire message must typically be downloaded to the mobile device. Unfortunately, downloading entire messages simply to retrieve the certificate information can be a time-consuming and expensive task (e.g. with respect to bandwidth). On the other hand, if only a small part of the message has been downloaded to the mobile device, or if the message is too long and cannot be downloaded to the mobile device due to an imposed limit, it may not be possible to identify the certificate that is required to verify the integrity of the received message and to authenticate the identity of the sender with any certainty.

SUMMARY OF THE INVENTION

Embodiments of the invention are generally directed to a system and method for more efficiently searching and retrieving certificates, in which the requisite certificate can be identified without requiring the sender's message to be downloaded in its entirety to the user's computing device (e.g. a mobile device). In particular, the system and method facilitates a determination of the requisite certificate from certificates located in a search of one or more certificate servers.

In one broad aspect of the invention, there is provided a method of searching and retrieving certificates relating to a message received by a user from a sender, the message comprising data identifying a sender certificate associated therewith, wherein certificate identification data that uniquely identifies the sender certificate can be generated from the message, and wherein the method comprises the steps of: receiving at least a part of the message and certificate identification data at a computing device; providing a certificate search request for certificates associated with the sender; performing a search on one or more certificate servers, wherein at least one query is submitted to the one or more certificate servers to request retrieval of located certificates satisfying the certificate search request; retrieving at least one located certificate from the one or more certificate servers; processing each located certificate retrieved, using the certificate identification data, to determine if the respective located certificate is the sender certificate associated with the message; and storing a located certificate on the computing device, if the located certificate is the sender certificate associated with the message as determined at the determining step.

In another broad aspect, the generated certificate identification data includes a serial number and issuer data for the sender certificate; and the processing step comprises parsing each located certificate retrieved to obtain the respective serial number and issuer data, and comparing the respective serial number and issuer data to the certificate identification data.

In another broad aspect, the generated certificate identification data includes a hash of at least a part of the sender certificate; and the processing step comprises applying a hash algorithm to each located certificate retrieved to obtain the respective hash, and comparing the respective hash to the certificate identification data.

In another broad aspect of the invention, there is provided a system for searching and retrieving certificates relating to a message received by a user from a sender, the message comprising data identifying a sender certificate associated therewith, the system comprising: a message management server adapted to generate certificate identification data from the message, wherein the certificate identification data uniquely identifies the sender certificate; a mobile device adapted to receive at least a part of the message, and the certificate identification data, from the message management server; and a mobile data server adapted to receive a search request for certificates associated with the sender from the mobile device, perform a search on one or more certificate servers by querying the one or more certificate servers for located certificates satisfying the search request, and retrieve located certificates from the one or more certificate servers; wherein at least one of the mobile device and the mobile data server is further adapted to process each located certificate retrieved at the mobile data server to determine, using the certification identification data, if the respective located certificate is the sender certificate associated with the message; and wherein the mobile device provides one or more certificate stores to store a located certificate determined to be the sender certificate associated with the message.

In another broad aspect, there is provided a method of searching and retrieving certificates relating to a message received by a user from a sender, the message comprising data identifying a sender certificate associated therewith, wherein the method comprises the steps of: generating certificate identification data for the sender certificate from the data in the received message identifying the sender certificate, wherein the certificate identification data uniquely identifies the sender certificate; receiving certificate identification data at a computing device; and determining whether the sender certificate is stored on the computing device, by generating certificate identification data associated with each of a plurality of certificates stored on the computing device, and comparing generated certificate identification data for each of the plurality of stored certificates to the certificate identification data generated for the sender certificate to identify a stored certificate matching the sender certificate.

BRIEF DESCRIPTION OF THE DRAWINGS

For a better understanding of embodiments of the invention, and to show more clearly how it may be carried into effect, reference will now be made, by way of example, to the accompanying drawings in which.

DETAILED DESCRIPTION OF EMBODIMENTS OF THE INVENTION

Some embodiments of the invention make use of a mobile station. A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 1:
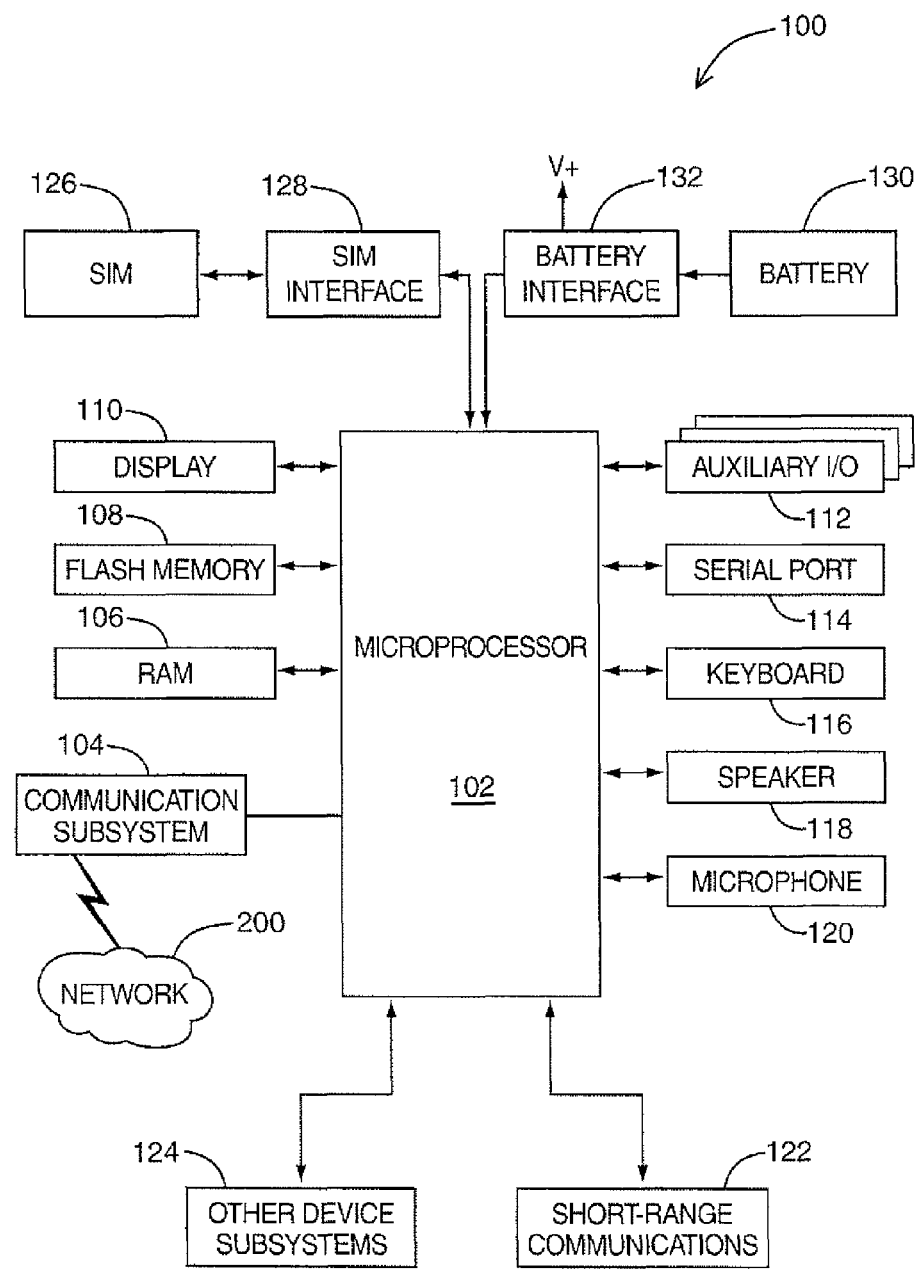
FIG. 1 is a block diagram of a mobile device in one example implementation.
Figure 2:
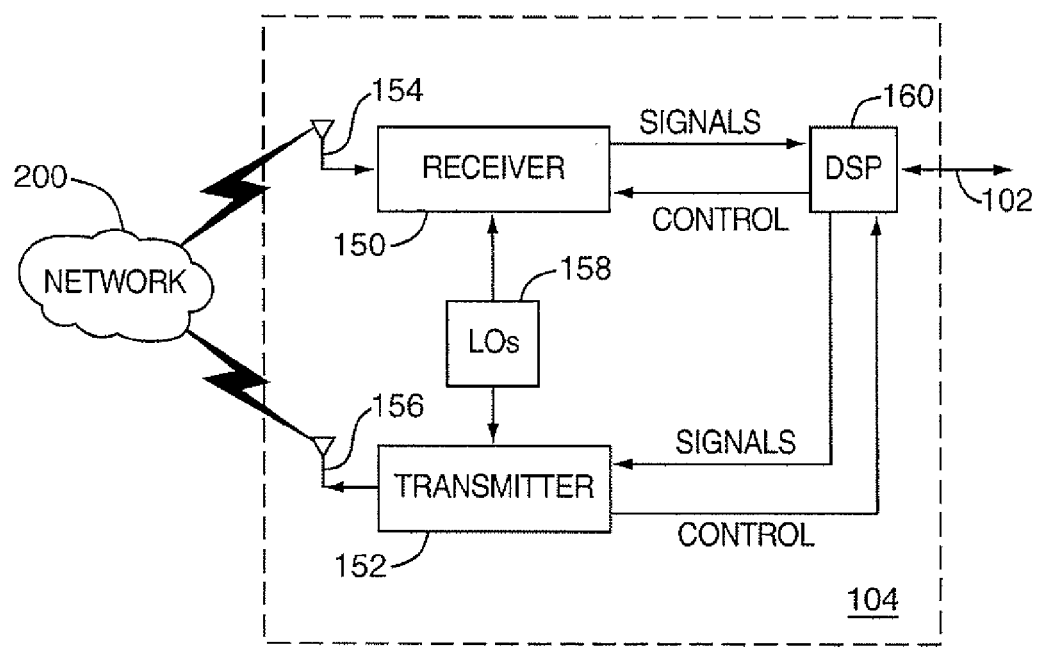
FIG. 2 is a block diagram of a communication subsystem component of the mobile device of FIG. 1.
Figure 3:
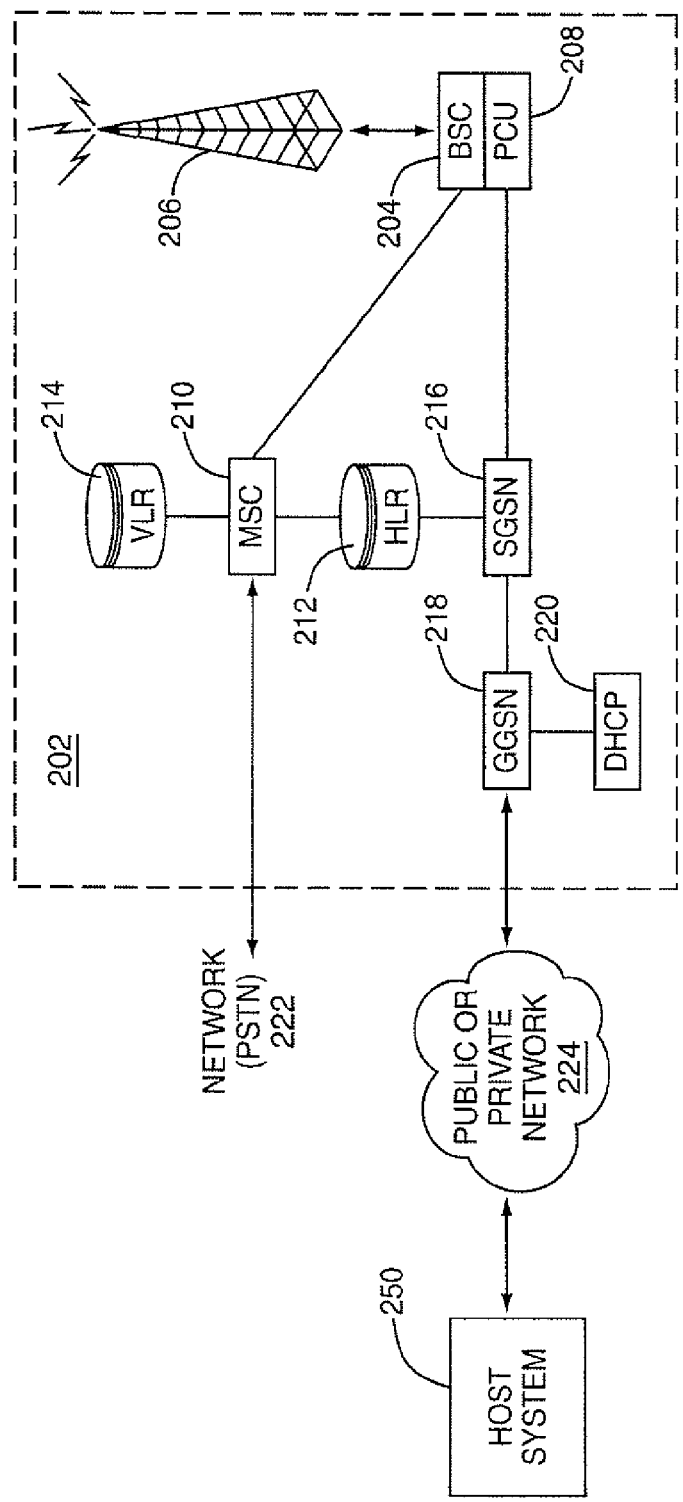
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
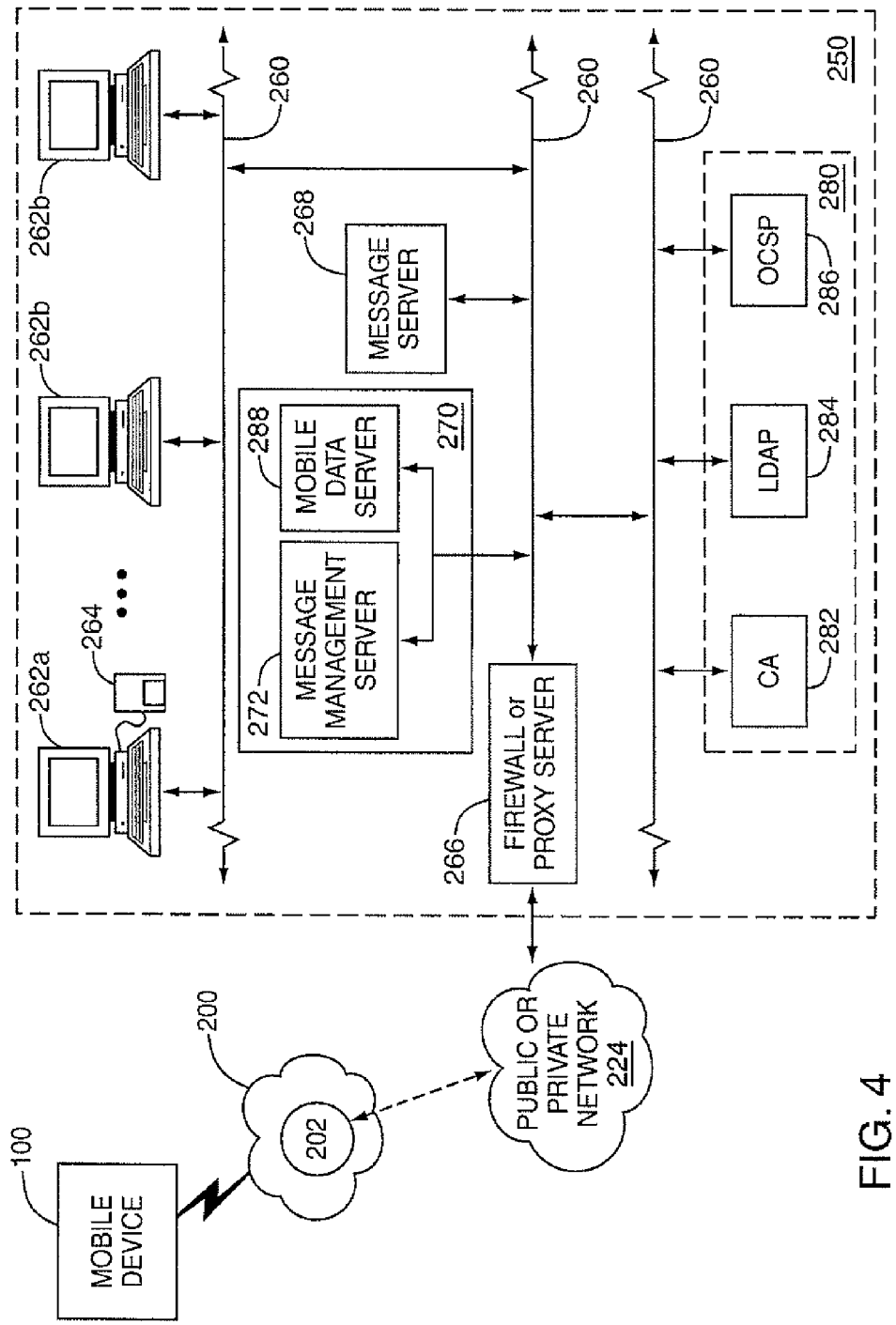
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computer 262a with an accompanying cradle 264 for the user's mobile device 100 is situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include certificates used in the exchange of messages. It will be understood by persons skilled in the art that user computers 262a, 262b will typically be also connected to other peripheral devices not explicitly shown in FIG. 4.

Embodiments of the invention relate generally to the processing of messages, such as e-mail messages, and some embodiments relate generally to the communication of such messages to and from mobile device 100. Accordingly, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages would then typically be retrieved from message server 268 and stored locally on computer 262a.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices need to be supported.

Embodiments of the invention relate generally to the processing of encoded messages, such as e-mail messages that are encrypted and/or signed. While Simple Mail Transfer Protocol (SMTP), RFC822 headers, and Multipurpose Internet Mail Extensions (MIME) body parts may be used to define the format of a typical e-mail message not requiring encoding, Secure/MIME (S/MIME), a version of the MIME protocol, may be used in the communication of encoded messages (i.e. in secure messaging applications). S/MIME enables end-to-end authentication and confidentiality, and protects data integrity and privacy from the time an originator of a message sends a message until it is decoded and read by the message recipient. Other known standards and protocols may be employed to facilitate secure message communication, such as Pretty Good Privacy™ (PGP), OpenPGP, and others known in the art.

Secure messaging protocols such as S/MIME rely on public and private encryption keys to provide confidentiality and integrity, and on a Public Key Infrastructure (PKI) to communicate information that provides authentication and authorization. Data encrypted using a private key of a private key/public key pair can only be decrypted using the corresponding public key of the pair, and vice-versa. Private key information is never made public, whereas public key information is shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate decryption of the message, and in this way, the confidentiality of messages can be maintained.

As a further example, a sender may sign a message using a digital signature. A digital signature is a digest of the message (e.g. a hash of the message) encrypted using the sender's private key, which can then be appended to the outgoing message. To verify the signature of the message when received, the recipient uses the same technique as the sender (e.g. using the same standard hash algorithm) to obtain a digest of the received message. The recipient also uses the sender's public key to decrypt the digital signature, in order to obtain what should be a matching digest for the received message. If the digests of the received message do not match, this suggests that either the message content was changed during transport and/or the message did not originate from the sender whose public key was used for verification. By verifying a digital signature in this way, authentication of the sender and message integrity can be maintained.

An encoded message may be encrypted, signed, or both encrypted and signed. The authenticity of public keys used in these operations is validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509).

Figure 5:
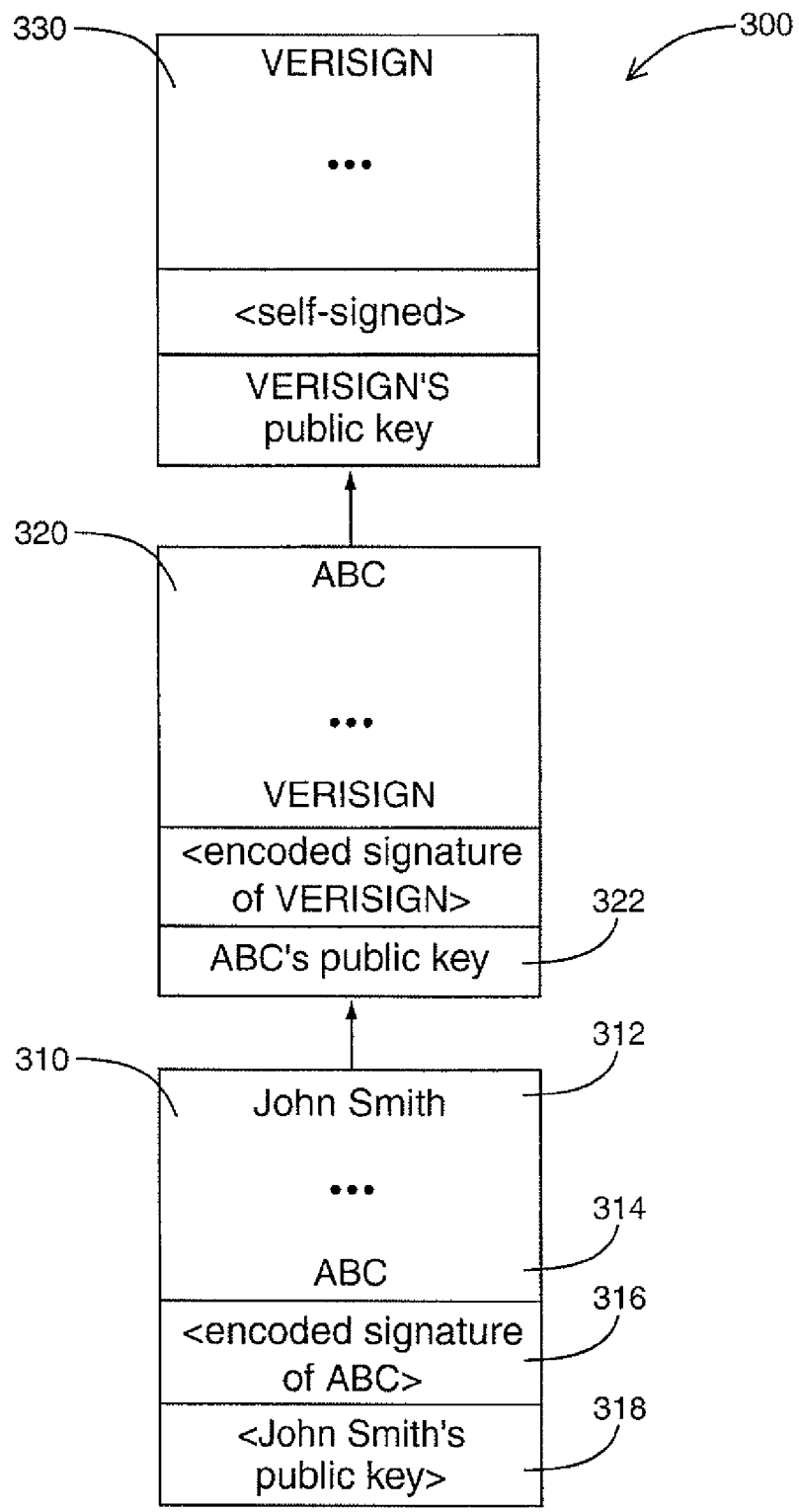
FIG. 5 is a block diagram showing an example of a certificate chain.

Consider FIG. 5, in which an example certificate chain 300 is shown. Certificate 310 issued to "John Smith" is an example of a certificate issued to an individual, which may be referred to as an end entity certificate. End entity certificate 310 typically identifies the certificate holder 312 (i.e. John Smith in this example) and the issuer of the certificate 314, and includes a digital signature of the issuer 316 and the certificate holder's public key 318. Certificate 310 will also typically include other information and attributes that identify the certificate holder (e.g. e-mail address, organization name, organizational unit name, location, etc.). When the individual composes a message to be sent to a recipient, it is customary to include that individual's certificate 300 with the message.

For a public key to be trusted, its issuing organization must be trusted. The relationship between a trusted CA and a user's public key can be represented by a series of related certificates, also referred to as a certificate chain. The certificate chain can be followed to determine the validity of a certificate.

For instance, in the example certificate chain 300 shown in FIG. 5, the recipient of a message purported to be sent by John Smith may wish to verify the trust status of certificate 310 attached to the received message. To verify the trust status of certificate 310 on a recipient's computing device (e.g. computer 262a of FIG. 4) for example, the certificate 320 of issuer ABC is obtained, and used to verify that certificate 310 was indeed signed by issuer ABC. Certificate 320 may already be stored in a certificate store on the computing device, or it may need to be retrieved from a certificate source (e.g. LDAP server 284 of FIG. 4 or some other public or private LDAP server). If certificate 320 is already stored in the recipient's computing device and the certificate has been designated as trusted by the recipient, then certificate 310 is considered to be trusted since it chains to a stored, trusted certificate.

However, in the example shown in FIG. 5, certificate 330 is also required to verify the trust of certificate 310. Certificate 330 is self-signed, and is referred to as a "root certificate". Accordingly, certificate 320 may be referred to as an "intermediate certificate" in certificate chain 300; any given certificate chain to a root certificate, assuming a chain to the root certificate can be determined for a particular end entity certificate, may contain zero, one, or multiple intermediate certificates. If certificate 330 is a root certificate issued by a trusted source (from a large certificate authority such as Verisign or Entrust, for example), then certificate 310 may be considered to be trusted since it chains to a trusted certificate. The implication is that both the sender and the recipient of the message trust the source of the root certificate 330. If a certificate cannot be chained to a trusted certificate, the certificate may be considered to be "not trusted".

Certificate servers store information about certificates and lists identifying certificates that have been revoked. These certificate servers can be accessed to obtain certificates and to verify certificate authenticity and revocation status. For example, a Lightweight Directory Access Protocol (LDAP) server may be used to obtain certificates, and an Online Certificate Status Protocol (OCSP) server may be used to verify certificate revocation status.

Standard e-mail security protocols typically facilitate secure message transmission between non-mobile computing devices (e.g. computers 262a, 262b of FIG. 4; remote desktop devices). Referring again to FIG. 4, in order that signed messages received from senders may be read from mobile device 100 and encrypted messages be sent to those senders, mobile device 100 is adapted to store certificates and associated public keys of other individuals. Certificates stored on a user's computer 262a will typically be downloaded from computer 262a to mobile device 100 through cradle 264, for example.

Certificates stored on computer 262a and downloaded to mobile device 100 are not limited to certificates associated with individuals but may also include certificates issued to CAs, for example. Certain certificates stored in computer 262a and/or mobile device 100 can also be explicitly designated as "trusted" by the user. Accordingly, when a certificate is received by a user on mobile device 100, it can be verified on mobile device 100 by matching the certificate with one stored on mobile device 100 and designated as trusted, or otherwise determined to be chained to a trusted certificate.

Mobile device 100 may also be adapted to store the private key of the public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key is preferably exchanged between the computer 262a and mobile device 100 so that the user may share one identity and one method for accessing messages.

User computers 262a, 262b can obtain certificates from a number of sources, for storage on computers 262a, 262b and/or mobile devices (e.g. mobile device 100). These certificate sources may be private (e.g. dedicated for use within an organization) or public, may reside locally or remotely, and may be accessible from within an organization's private network or through the Internet, for example. In the example shown in FIG. 4, multiple PKI servers 280 associated with the organization reside on LAN 250. PKI servers 280 include a CA server 282 for issuing certificates, an LDAP server 284 used to search for and download certificates (e.g. for individuals within the organization), and an OCSP server 286 used to verify the revocation status of certificates.

Certificates may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates through a mobile data server 288. Similarly, mobile data server 288 may be adapted to allow mobile device 100 to directly query OCSP server 286 to verify the revocation status of certificates.

It will be understood by persons skilled in the art that mobile data server 288 need not physically reside on a separate computing device from the other components of LAN 250, and that mobile data server 288 may be provided on the same computing device as another component of LAN 250 in variant implementations. Furthermore, the functions of mobile data server 288 may be integrated with the functions of another component in LAN 250 (e.g. message management server 272) in variant implementations.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of certificates [not shown] may include a Windows certificate store, another secure certificate store on or outside LAN 250, and smart cards, for example.

Figure 6:
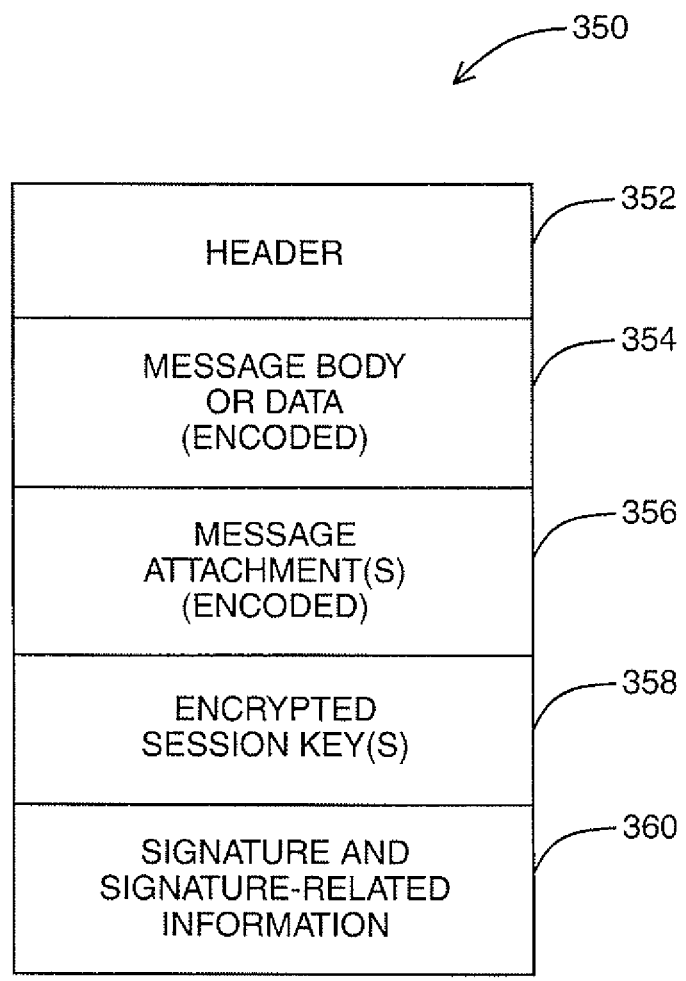
FIG. 6 is a block diagram illustrating components of an example of an encoded message.

Referring now to FIG. 6, a block diagram illustrating components of an example of an encoded message, as may be received by a message server (e.g. message server 268 of FIG. 4), is shown generally as 350. Encoded message 350 typically includes one or more of the following: a header portion 352, an encoded body portion 354, optionally one or more encoded attachments 356, one or more encrypted session keys 358, and signature and signature-related information 360. For example, header portion 352 typically includes addressing information such as "To", "From", and "CC" addresses, and may also include message length indicators, and sender encryption and signature scheme identifiers, for example. Actual message content normally includes a message body or data portion 354 and possibly one or more attachments 356, which may be encrypted by the sender using a session key. If a session key was used, it is typically encrypted for each intended recipient using the respective public key for each recipient, and included in the message at 358. If the message was signed, a signature and signature-related information 360 are also included. This may include the sender's certificate, for example.

The format for an encoded message as shown in FIG. 6 is provided by way of example only, and persons skilled in the art will understand that embodiments of the invention will be applicable to encoded messages of other formats. Depending on the specific messaging scheme used, components of an encoded message may appear in a different order than shown in FIG. 6, and an encoded message may include fewer, additional, or different components, which may depend on whether the encoded message is encrypted, signed or both.

Embodiments of the invention are generally directed to a system and method for searching and retrieving certificates. In one embodiment, a certificate search application residing and executing on a mobile device (e.g. mobile device 100 of FIG. 4) is programmed to initiate certificate searches on one or more certificate servers (e.g. LDAP server 284 of FIG. 4). In this embodiment, the mobile device searches for and retrieves certificates from a certificate server through an intermediate computing device (e.g. mobile data server 288 of FIG. 4).

With reference to FIG. 4, consider an example implementation where a certificate search application on mobile device 100 searches for and retrieves individual certificates from LDAP server 284 through mobile data server 288. A search request is received by the certificate search application, typically from a user who provides a first name, last name, and e-mail address of an individual for whom the user wishes to locate a certificate. Certain search requests may also be made broader, by constructing search queries where inputting only a few letters of a name will return all certificates issued with a name containing those letters as a prefix, or by otherwise using wild cards or blank entries in input fields to expand a search, for example. The search request is then communicated from mobile device 100 to mobile data server 288, which then queries LDAP server 284 for the requested certificate(s). In this example implementation, located certificates are retrieved by the mobile data server 288, and specific search result data relating to each retrieved certificate, such as the common name and e-mail address of the individual (or entity) to which the respective certificate is issued, is communicated to the mobile device 100 so that a list can be generated from the search result data for display to the user. The user can then select specific certificates for downloading to and storage on mobile device 100 from the list. The selections are then communicated to mobile data server 288, from which the selected certificates are downloaded to mobile device 100.

When a user of mobile device 100 receives a signed message from a sender, the certificate of the sender is required in order to verify the integrity of the message and authenticate the identity of the sender. This certificate may also be referred to herein in the specification and in the claims as a "sender certificate" or "sender's certificate". Consider the situation where only a part of the received message has been downloaded to mobile device 100, for viewing by a user through a messaging application executing and residing on mobile device 100. The part of the message received likely includes header information (e.g. header 352 of FIG. 6) from which at least the sender's e-mail address can typically be obtained. However, the part of the message received by mobile device 100 might not include the sender's certificate or identifiers that can be used to identify the requisite certificate, since such signature-related information is typically attached near the end of a message (see e.g., signature and signature-related information 360 of FIG. 6).

The certificate search application on mobile device 100 can be activated (e.g. by the user selecting an appropriate menu option made accessible when the message is being viewed) to download the sender's certificate. Since the sender's e-mail address can be obtained from the downloaded header information, the certificate search application can automatically initiate a search for certificates having a matching e-mail address, on one or more certificate servers (e.g. LDAP server 284) through the mobile data server 288. In particular, where the message is not accompanied by the sender's certificate, the certificate may need to be retrieved from a certificate server by the certificate search application.

However, multiple certificates matching the specified e-mail address may be located by the search. In prior art systems, if the part of the message containing the necessary information to correctly identify the requisite certificate associated with that message was not downloaded to mobile device 100, the user may not be able to select the correct certificate from a list identifying the multiple certificates located in the search with certainty. The user would then have to guess at the correct certificate, or download all the located certificates for storage on the mobile device, which consumes time and bandwidth. Similar problems may arise where data other than an e-mail address is retrieved from a message and used to perform a certificate search.

Accordingly, embodiments of the invention relate generally to methods that can facilitate a determination of the certificate associated with a message, from a plurality of certificates located in a search of one or more certificate servers, even where a message has not been downloaded in its entirety to a user's computing device (e.g. mobile device).

Figure 7A:
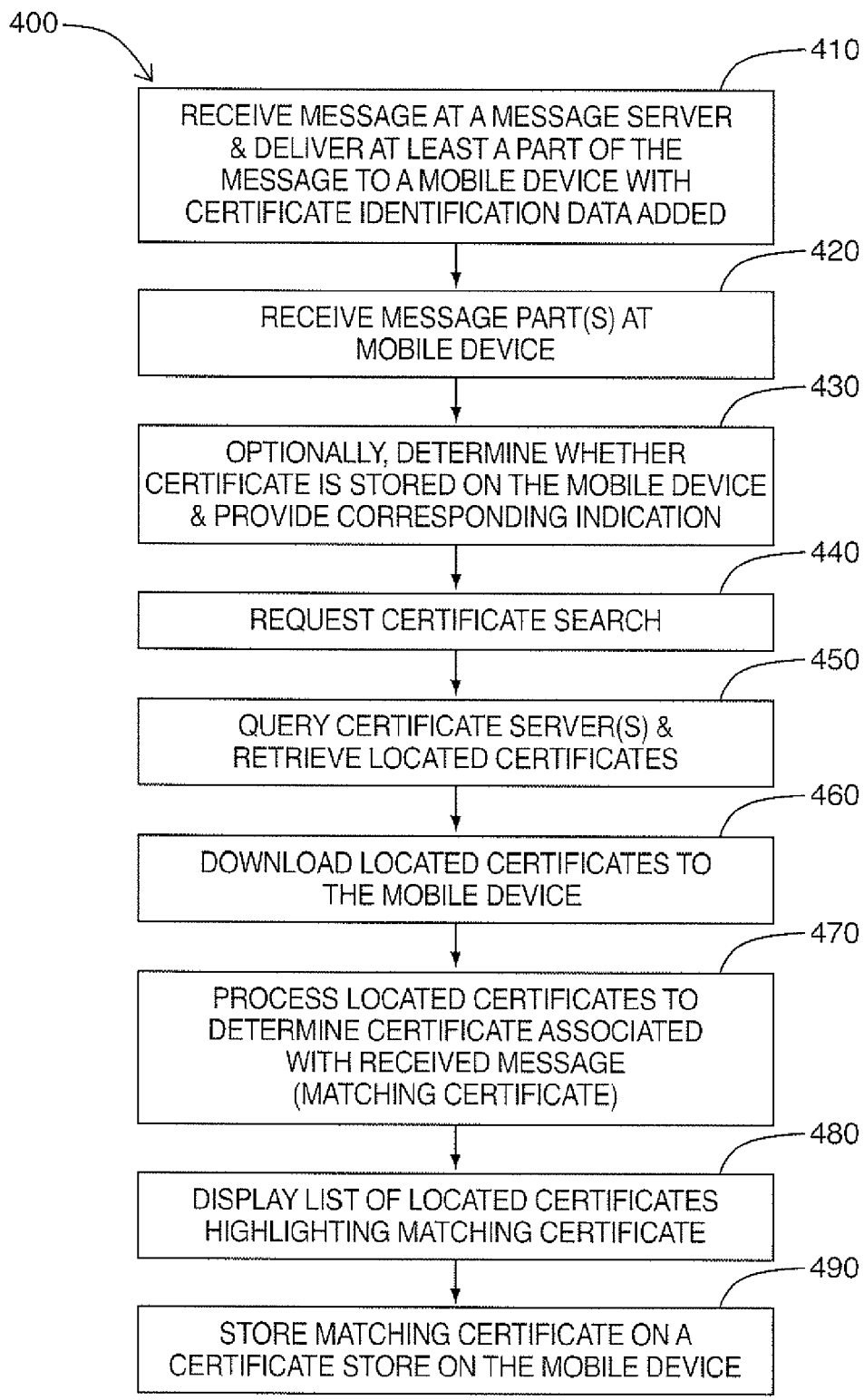
FIG. 7A is a flowchart illustrating steps in a method of searching and retrieving certificates in an embodiment of the invention.

Referring to FIG. 7A, a flowchart illustrating steps in a method of searching and retrieving certificates in an embodiment of the invention is shown generally as 400.

At step 410, a message addressed to the user of a computing device (e.g. mobile device 100 of FIG. 4) is received at a message server (e.g. message server 268 of FIG. 4). In one example implementation, a message management server (e.g. message management server 272 of FIG. 4) pushes a first part of the received message stored on the message server to a mobile device. The message management server can deliver further parts of the received message at the request of the user, possibly up to a maximum pre-defined message size. The message parts delivered to the mobile device will generally include header information (e.g. header 352 of FIG. 6), which is typically provided at the beginning of a message.

In embodiments of the invention, the message management server adds certificate identification data to the delivered message parts (e.g. to the header of the message). If a certificate accompanies the received message, then the message management server can process the certificate to generate the certificate identification data. In one embodiment, the message management server applies a hash algorithm to hash at least a part of the certificate. The hash is then used as the certificate identification data to be added to the message parts (e.g. header) being delivered to the mobile device. In one implementation, the entire certificate is hashed to generate the hash. However in variant implementations, one or more specific parts or fields of a certificate may be hashed to generate the hash, although the likelihood that the hash will uniquely and correctly identify an identical certificate may be decreased depending on the parts or fields hashed.

In another embodiment, the message management server processes the certificate accompanying the received message, by parsing the certificate to identify the serial number and issuer of the certificate. This serial number and issuer data is then used as the certificate identification data to be added to the message parts (e.g. header) being delivered to the mobile device.

Similarly, where the sender's certificate does not accompany the received message, the message management server may parse the signature-related information in the message to retrieve data that identifies the sender's certificate associated with the message, such as the serial number and issuer of the certificate used to sign the message, for example. This data is then used as the certificate identification data to be added to the message parts (e.g. header) being delivered to the mobile device.

In some applications, use of the serial number and issuer data from a certificate as certificate identification data might be considered to be less secure, when compared to the use of a hash of an actual certificate (which certificate can be validated as described with reference to FIG. 5), since the serial number and issuer data may be easier to forge. However, use of either type of certificate identification data may be useful in variant implementations, depending on the level of security desired.

The generated certificate identification data can be used to uniquely identify the sender's certificate associated with the received message. This may be particularly useful when the actual signature and signature-related information of the received message (e.g. signature and signature-related information 360 of FIG. 6) has not been delivered to the mobile device.

At step 420, a messaging application residing and executing on the mobile device receives one or more parts of the received message, which includes the certificate identification data, from the message management server. Additional parts of the received message may be retrieved from the message management server in response to a user request.

Optionally, at step 430, the messaging application can use the certificate identification data received from the message management server to determine whether the certificate associated with the received message is already stored on the mobile device in one or more designated certificate stores thereof. A corresponding indication of whether or not the certificate is already stored may be provided with the message part(s) being displayed, or alongside an entry where the message is identified in a list of messages received by the user, for example.

For example, in an embodiment where the certificate identification data comprises a hash, at step 430, the messaging application generates a hash for each certificate stored on the mobile device in one or more designated certificate stores thereof, and compares each generated hash to the hash provided as certificate identification data, in order to determine whether the certificate is already stored on the mobile device. The same hash algorithm employed at step 410 is applied at this step (to the same parts or fields of the stored certificates if the entire certificates are not hashed) in generating the hashes of the stored certificates. Accordingly, if a generated hash of a given store certificate matches the hash received from the message management server, then a match is deemed to have been determined.

Alternatively, in an embodiment where the certificate identification data comprises serial number and issuer data, at step 430, the messaging application compares the serial number and issuer data associated with each certificate stored on the mobile device in one or more designated certificate stores thereof to the serial number and issuer data provided as certificate identification data, in order to determine whether the certificate is already stored on the mobile device.

In variant implementations, step 430 may be performed by an application residing and executing on the mobile device other than the messaging application (e.g. by a certificate search application).

At step 440, a search request for the certificate is made by a certificate search application residing and executing on the mobile device. For example, the search request may be initiated by a user, who selects a menu option provided by the messaging application that activates the certificate search application. Alternatively, the messaging application or some other application on the mobile device may automatically activate the certificate search application, upon receiving a message for example, and possibly after determining that the certificate is not already stored on the mobile device at step 430.

In requesting a certificate search at step 440, the certificate search application transmits the search request to at least one certificate server (e.g. LDAP server 284 of FIG. 4) through a mobile data server (e.g. mobile data server 288 of FIG. 4) in one example implementation. The search request comprises data that typically includes an e-mail address, and possibly at least one name associated with the sender of the received message. However, it will be understood by persons skilled in the art that a variety of search queries may be constructed without departing from the scope of the invention.

At step 450, the mobile data server queries the at least one certificate server for certificates satisfying the search request that was made at step 440 by the certificate search application of the mobile device. Certificates located as a result of the search query are retrieved from the at least one certificate server by the mobile data server.

At step 460, the located certificates are downloaded to the mobile device from the mobile data server. The downloaded certificates are typically stored temporarily on the mobile device to undergo further processing.

At step 470, the located certificates downloaded to the mobile device at step 460 are processed by the certificate search application, to determine which located certificate, if any, matches the certificate associated with the received message, as identified by the certificate identification data accompanying the received message.

In an embodiment where the certificate identification data comprises a hash, the certificate search application generates a hash for each located certificate, and compares each generated hash to the hash provided as certificate identification data, in order to determine the proper match. The same hash algorithm employed at step 410 is applied at this step (to the same parts or fields of the stored certificates if the entire certificates are not hashed) in generating the hashes of the stored certificates. Accordingly, if a generated hash of a given located certificate matches the hash provided as certificate identification data, then a match is deemed to have been determined.

Alternatively, in an embodiment where the certificate identification data comprises serial number and issuer data, the certificate search application compares the serial number and issuer data associated with each located certificate to the serial number and issuer data provided as certificate identification data, in order to determine the proper match.

Optionally, at step 480, a list identifying the located certificates downloaded at step 460 may be displayed to a user, with an indicator or other highlighting technique used to identify the matching certificate in the list. The user may then be prompted to select the matching certificate (and possibly other located certificates) to be stored in a certificate store on the mobile device for future use.

At step 490, the matching certificate is stored in a certificate store on the mobile device. In one embodiment, this step may be performed automatically by the certificate search application, without prompting a user for its selection at step 480.

In a variant embodiment, the matching certificate may also be validated [step not shown], to verify its trust status for example, before or after storage.

Figure 7B:
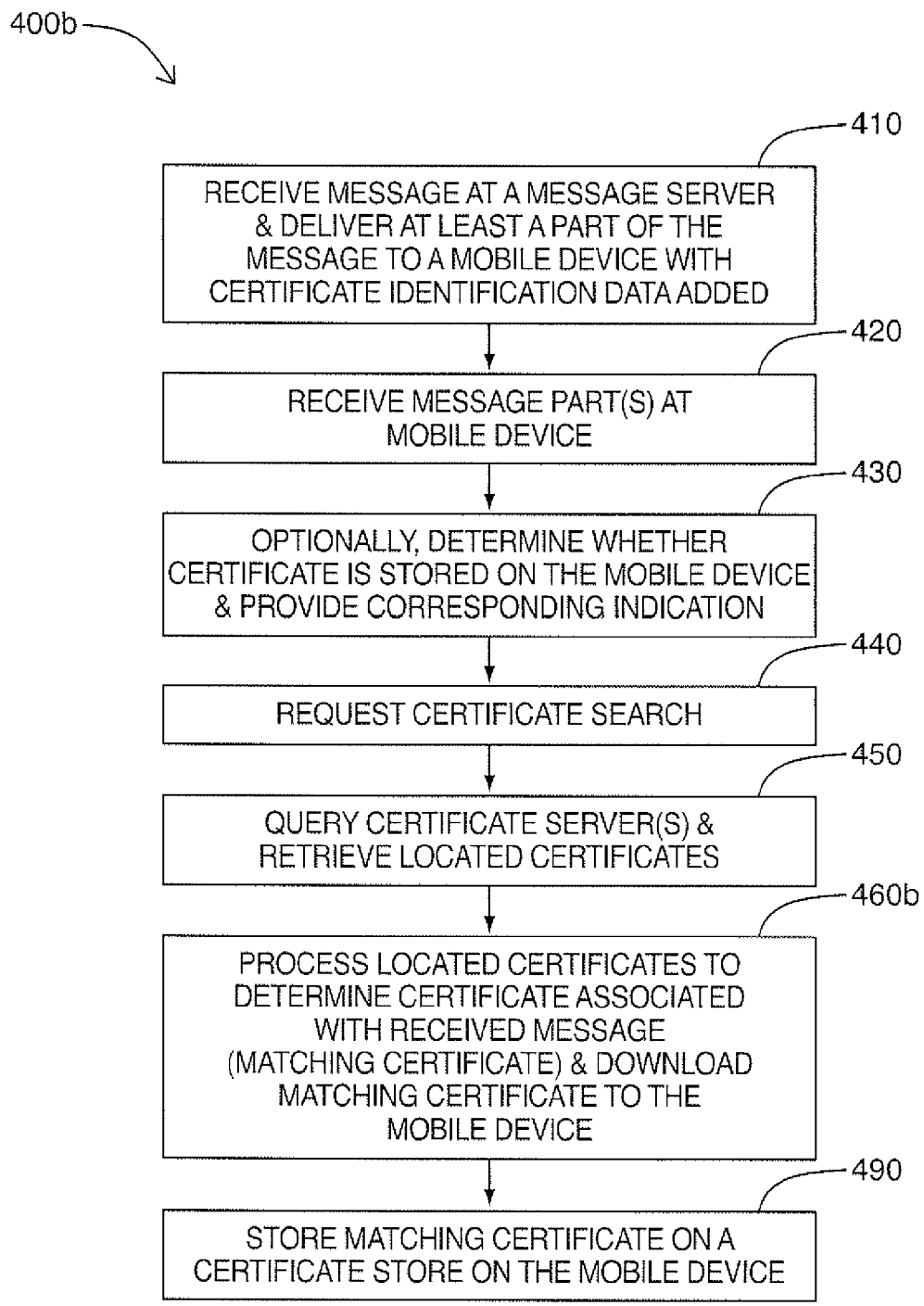
FIG. 7B is a flowchart illustrating steps in a method of searching and retrieving certificates in another embodiment of the invention.

Referring now to FIG. 7B, a flowchart illustrating steps in a method of searching and retrieving certificates in another embodiment of the invention is shown generally as 400b. Method 400b is similar to method 400, except that the certificate search application may pass the certificate identification data to the mobile data server (e.g. with the search request), so that the mobile data server can return only the matching certificate to the mobile device, instead of all of the certificates located in the search.

Specifically, at step 440, the certificate identification data initially received at the mobile device from the message management server is forwarded to the mobile data server with the search request, in this embodiment of the invention.

At step 460b, the mobile data server processes the located certificates to determine which located certificate matches the certificate associated with the received message, as identified by the certificate identification data received at the mobile data server from the mobile device at step 440. Only the matching certificate is then downloaded to the mobile device at this step, for subsequent storage in a certificate store on the mobile device at step 490. The user may be prompted for permission to save the matching certificate before storage [step not shown].

Details pertaining to the remaining steps shown in FIG. 7B are provided with reference to FIG. 7A.

In variant embodiments of the invention, other data that can be used to uniquely identify a certificate can be employed as certificate identification data.

In a variant embodiment of the invention, located certificates may be retrieved from one or more certificate servers and downloaded to a mobile device without being transmitted via a mobile data server or other intermediate computing device.

Embodiments of the invention have been described above with reference to a mobile device. However, some embodiments may also be applied to a device that is adapted to receive encoded messages other than a mobile device.

The steps of a method of searching and retrieving certificates in embodiments of the invention may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A method of searching and retrieving certificates relating to a message received from a sender, the message comprising a first part and a second part, the first part comprising a header and a message body of the message, and the second part comprising data identifying a sender certificate associated with the message, wherein the method comprises:
   at a computing device, receiving,
      at least some data of the first part of the message but not of the second part of the message, wherein the at least some data of the first part of the message contains first certificate identification data that uniquely identifies the sender certificate;
   performing a search on one or more certificate servers, wherein at least one query is submitted to the one or more certificate servers to request retrieval of certificates satisfying a certificate search request;
   retrieving at least one certificate satisfying the certificate search request from the one or more certificate servers; and
   processing each retrieved certificate using the first certificate identification data to determine if any of the retrieved at least one certificate is the sender certificate associated with the message.

2. The method of claim 1, wherein the processing comprises:
   generating second certificate identification data associated with each retrieved certificate; and
   comparing the generated second certificate identification data for each retrieved certificate to the first certificate identification data contained in the at least some data of the first part of the message, to identify a certificate of the at least one retrieved certificate matching the sender certificate.

3. The method of claim 2, wherein the generated second certificate identification data associated with each retrieved certificate comprises a serial number and issuer data for the certificate; and wherein the generating second certificate identification data comprises parsing each retrieved certificate to obtain the serial number and issuer data for the certificate.

4. The method of claim 2, wherein the generated second certificate identification data associated with each retrieved certificate comprises a hash of at least a part of the certificate; and wherein the generating second certificate identification data comprises applying a hash algorithm to each retrieved certificate to obtain the hash for the certificate.

5. The method of claim 1, wherein the message is received via a server remote from the computing device, and wherein the first certificate identification data was added to the message by the server.

6. The method of claim 1, wherein the computing device comprises a mobile device.

7. The method of claim 6, wherein the performing and retrieving are initiated at a second computing device coupled to the mobile device.

8. The method of claim 7, wherein the second computing device comprises a mobile data server.

9. The method of claim 7, wherein the processing is performed at the second computing device, and wherein the method further comprises downloading, to the mobile device from the second computing device, a certificate of the at least one retrieved certificate if the certificate is the sender certificate associated with the message.

10. The method of claim 7, wherein the processing is performed at the mobile device, and wherein the method further comprises downloading each retrieved certificate to the mobile device from the second computing device.

11. The method of claim 1, further comprising storing a certificate of the at least one retrieved certificate on the computing device, if the certificate is the sender certificate associated with the message.

12. A system for searching and retrieving certificates relating to a message received from a sender, the message comprising a first part and a second part, the first part comprising a header and a message body of the message, and the second part comprising data identifying a sender certificate associated with the message, the system comprising:
  a first computing device configured to:
    receive at least some data of the first part of the message but not of the second part of the message, wherein the at least some data of the first part of the message contains first certificate identification data that uniquely identifies the sender certificate; and
  a second computing device;
  wherein at least one of the first computing device and the second computing device is configured to:
    perform a search on one or more certificate servers, wherein at least one query is submitted to the one or more certificate servers to request retrieval of certificates satisfying a certificate search request; and
    retrieve at least one certificate satisfying the certificate search request from the one or more certificate servers;
  and wherein at least one of the first computing device and the second computing device is further configured to process each retrieved certificate using the first certificate identification data to determine if any of the retrieved at least one certificate is the sender certificate associated with the message.

13. The system of claim 12, wherein when processing each retrieved certificate, the at least one of the first computing device and the second computing device is further configured to:
  generate second certificate identification data associated with each retrieved certificate; and
  compare the generated second certificate identification data for each retrieved certificate to the first certificate identification data contained in the at least some data of the first part of the message, to identify a certificate of the at least one retrieved certificate matching the sender certificate.

14. The system of claim 13, wherein the generated second certificate identification data associated with each retrieved certificate comprises a serial number and issuer data for the certificate; and wherein when generating the second certificate identification data, the at least one of the first computing device and the second computing device is further configured to parse each retrieved certificate to obtain the serial number and issuer data for the certificate.

15. The system of claim 13, wherein the generated second certificate identification data associated with each retrieved certificate comprises a hash of at least a part of the certificate; and wherein when generating the second certificate identification data, the at least one of the first computing device and the second computing device is further configured to apply a hash algorithm to each retrieved certificate to obtain the hash for the certificate.

16. The system, of claim 12, wherein the message is received via a server remote from the computing device, and wherein the first certificate identification data was added to the message by the server.

17. The system of claim 12, wherein the first computing device comprises a mobile device.

18. The system of claim 12, wherein the second computing device comprises a mobile data server.

19. The system of claim 12, wherein the second computing device processes each retrieved certificate, and wherein the first computing device is further configured to download from the second computing device, a certificate of the at least one retrieved certificate if the certificate is the sender certificate associated with the message.

20. The system of claim 12, wherein the first computing device processes each retrieved certificate, and wherein prior to the processing, the first computing device is further configured to download each retrieved certificate to the first computing from the second computing device.

21. The system of claim 19, wherein the first computing device is further configured to store the certificate.

22. A non-transitory computer-readable medium storing instructions for execution on at least one of a first computing device and a second computing device, the instructions for performing a method of searching and retrieving certificates relating to a message received from a sender, the message comprising a first part and a second part, the first part comprising a header and a message body of the message, and the second part comprising data identifying a sender certificate associated with the message, wherein when the instructions are executed,
  the first computing device:
    receives at least some data of the first part of the message but not of the second part of the message, wherein the at least some data of the first part of the message contains first certificate identification data that uniquely identifies the sender certificate;
  at least one of the first computing device and the second computing device:
    performs a search on one or more certificate servers, wherein at least one query is submitted to the one or more certificate servers to request retrieval of certificates satisfying a certificate search request; and
    retrieves at least one certificate satisfying the certificate search request from the one or more certificate servers; and
  at least one of the first computing device and the second computing device processes each retrieved certificate using the first certificate identification data to determine if any of the retrieved at least one certificate is the sender certificate associated with the message.

* * * * *